United States Patent [19]

Nagaoka

[11] Patent Number: 4,856,074
[45] Date of Patent: Aug. 8, 1989

[54] REGION RECOGNIZING DEVICE

[75] Inventor: Daiji Nagaoka, Kanagawa, Japan

[73] Assignee: Fuji Xerox Co., Ltd., Tokyo, Japan

[21] Appl. No.: 165,602

[22] Filed: Mar. 8, 1988

[30] Foreign Application Priority Data

Mar. 20, 1987 [JP] Japan ................................. 62-63972

[51] Int. Cl.⁴ .......................... G06K 9/46; G06K 9/12
[52] U.S. Cl. ......................................... 382/22; 382/9; 382/48
[58] Field of Search .................. 358/280, 282; 382/22, 382/48, 61, 9

[56] References Cited

U.S. PATENT DOCUMENTS

| | | | |
|---|---|---|---|
| 4,189,711 | 2/1980 | Frank | 382/22 |
| 4,538,182 | 8/1985 | Saito | 382/61 |
| 4,791,676 | 12/1988 | Flickner | 382/22 |

Primary Examiner—Reinhard J. Eisenzopf
Assistant Examiner—Jose M. Solis
Attorney, Agent, or Firm—Finnegan, Henderson, Farabow, Garrett & Dunner

[57] ABSTRACT

The invention relates to an apparatus for detecting a closed loop inscribed on a drawing and determining which sections of the document fall outside, inside or on the loop. Those sections of the document having a desired relation to the loop are then deleted, moved, etc. The invention can detect multiple loops and loops of different colors.

12 Claims, 4 Drawing Sheets (GO SCANNING)

CONCERNED BLOCK, PREVIOUS BLOCK AND ABOVE BLOCK     STATUS OF CONCERNED BLOCK (RETURN SCANNING)

| | CONCERNED BLOCK, PREVIOUS BLOCK AND STATUS OF CONCERNED BLOCK | REVISED STATUS OF CONCERNED BLOCK |

REGION RECOGNIZING DEVICE

BACKGROUND OF THE INVENTION

1. Field of the Invention

The present invention relates to a region recognizing device for recognizing a region marked with a closed loop on an original document to be read.

2. Description of the Prior Art

Sometimes, it is necessary to eliminate a part of an original document, hereafter referred to as an original, or to shift a part of it to a different position. Heretofore, the original has been copied, the copy cut into pieces, and the pieces rearranged to form a desired original. However, this method is troublesome because it is necessary to cut the copy into pieces and to glue the pieces. Furthermore, in this method, steps are formed on the original along the border lines of the pieces glued. When the original is read, shadows sometimes form by these steps, causing noises representing the border lines to appear when the original is read mechanically.

A method of using a coordinates specifying device to specify a region of an original which is to be removed, shifted or so forth has been employed in the art. However, in this method, it is necessary to specify X-Y coordinates, and the X-Y coordinates specifying operation takes a relatively long period of time. Furthermore, a large number of points must be specified for intricate configurations. Thus, the method is applicable only to the specifying of simple configurations.

For the purpose of eliminating the above-described difficulties, an image processing system has been proposed by Japanese Patent Application (OPI) No. 194670/1982 (the term "OPI" means "an unexamined published application"). In such image processing system, an original in which a region is specified with a loop is optically read, the resultant optical image is utilized to obtain loop data, and the optically read data of the original are processed according to the loop data.

More specifically, the loop is drawn in a predetermined color and the optical reading operation is carried out with color discriminating means. The predetermined color data obtained is subjected to main scanning compression and auxiliary scanning compression. The color data thus compressed is supplied to an edge detector to detect edges. The detection data is supplied to a region detector comprising a D flip-flop. The flip-flop is set by the front edge data in a line, and reset by the rear edge data. Thus, the region specified can be recognized with a pair of front and rear edge data.

If, in the above-described conventional image processing system, more than one closed-loop is drawn on one original, then edge data are provided in mixed form. This sometimes results in a situation where it is impossible to accurately distinguish the closed loops from one another and, therefore, sometimes the region determining operation involves errors. In the case where an intricately configured closed loop is drawn, odd numbered pieces of edge data are sometimes read from a single line. In this case, the conventional system cannot accurately recognize the region, because it utilizes the edge data of the preceding line.

Accordingly, an object of this invention is to provide a region recognizing device which can recognize the region or regions with high accuracy even if a plurality of closed loops are drawn on an original or a complicated region is specified.

SUMMARY OF THE INVENTION

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

To achieve the objects and in accordance with the purpose of the invention, as embodied and broadly described herein, the invention comprises a region recognizing device for detecting a closed loop line inscribed on a document, the region recognizing device comprising reading means operative to scan individual lines of the document for generating successive blocks of image data of the document for each scan line in succession, each block having a corresponding block in a preceding line. Line storing means are provided for storing successive blocks of image data for at least one of the scan lines. There are also included mark identifying means for identifying each of the successive blocks of the scan line as being on the closed loop line of the document, and single status latch means for storing a status of each of the blocks of a scanned line in succession, the status indicative of the position of the block being alternately outside, inside, or on the closed loop line of the document. The present device also comprises multiple status storing means for storing the status of each of the successive blocks of the scanned line, and status determining means responsive (i) to the mark identifying means, (ii) to the status of a previous block stored in the single status latch means, and (iii) to the status of a corresponding block in a line where the status has been determined previously for each of the successive blocks of the line and where such status is stored in the multiple status storing means, for determining the status of each of the successive blocks of the scanned line.

In the present invention, in recognizing a region defined with a closed loop marked on an original document, such document hereafter referred to as an original, reading means capable of reading a plurality of colors is used to read the closed loop which distinguishes one section of the original from another section of the original. In this operation, blocks each comprising at least one picture element, or pixel, are employed. The status indicating whether a block is located inside or outside the closed loop is stored for as much as one line of blocks. Whenever a block is read, the status of the corresponding block from the preceding scan line and the status of the block adjacent to the block thus read are utilized to determine the status of the block read, and to revise the status stored for that block. The closed loop region recognition according to the invention is carried out in the above-described manner.

The status revising operation may be achieved by scanning each line twice, back and forth.

In the region recognizing device of the invention, the region is recognized in lines while the status of adjacent blocks is being referred. Therefore, the region recognition can be achieved with high accuracy. Accordingly, even in the case where a plurality of closed loops are drawn on an original or a closed loop is intricate in configuration, region recognition can be positively carried out.

The accompanying drawings, which are incorporated in and constitute a part of this specification, illustrate one embodiment of the invention and, together with the description, serve to explain the principles of the invention.

BRIEF DESCRIPTION OF THE DRAWINGS

The accompanying drawings show one embodiment of this invention.

DESCRIPTION OF THE PREFERRED EMBODIMENTS

Reference will now be made in detail to the present preferred embodiment of the invention, an example of which is illustrated in the accompanying drawings. Wherever possible, the same reference numbers will be used throughout the drawings to refer to the same or like parts.

Figure 1:
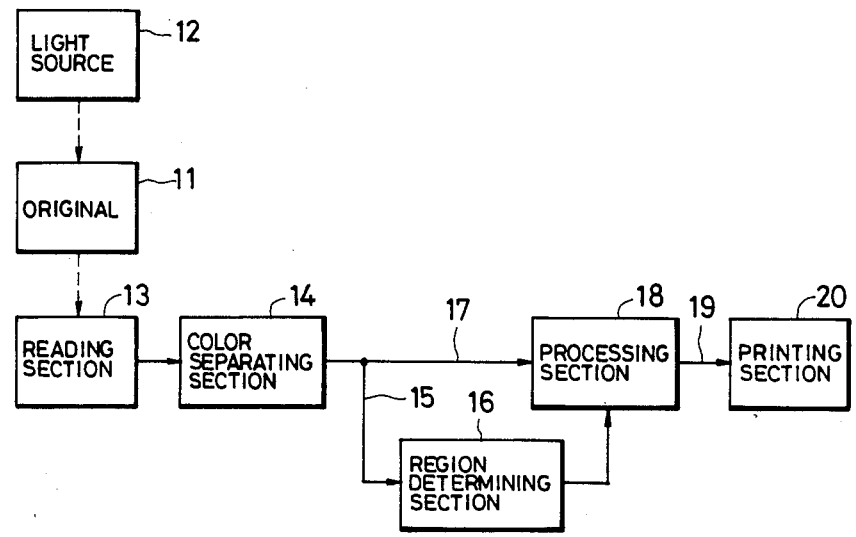
FIG. 1 is a block diagram showing an image processing device using a region recognizing device according to the invention.

FIG. 1 is a block diagram outlining the arrangement of a image processing device to which a region recognizing device according to the invention is applied.

In the device, an original 11 is illuminated by a light source 12, and a light beam reflected therefrom is applied to a reading section 13. The reading section 13 preferably is made up of a one-dimensional image sensor comprising a CCD (charge-coupled device). The reading section 13 is adapted to scan the original 11 in the right-to-left direction line by line beginning with the upper right corner. The reading section 13 preferably is provided with a multi-color reading mechanism which is made up of a color filter switching mechanism.

In the embodiment, two different color filters are switched every main scanning operation. More specifically, with one of the color filters selected, a main scanning operation is carried out to read a line, and then, with the other color filter selected, another main scanning operation is carried out to read the same line. Thereafter either the original 11 or the reading section 13 is moved to the next scanning position so that the scanning operation is carried out in the same manner. This operation is carried out repeatedly.

The reading section 13 outputs an image signal, which is applied to a color separating section 14. In the section 14, a closed-loop-shaped mark in a selected color is subjected to color separation and supplied, as mark data 15, to a region determining section 16. Ordinary image data 17 of characters or the like provided on the original 11 are supplied to a processing section 18.

When the region of a closed loop drawn in color A is recognized and the image data 17 of the region thus recognized are processed (eliminated or shifted, for instance), color A mark data are supplied to the region determining section 16 for performance of a region determining operation. The region determining method will be described later. The result of determination of the region is supplied to the processing section 18, where the image data 17 are processed according to a processing mode selected in advance. As a result, the processing section 18 outputs image data 19. The image data 19 are supplied to a printing section 20, where the image thus processed is printed.

Figure 2:
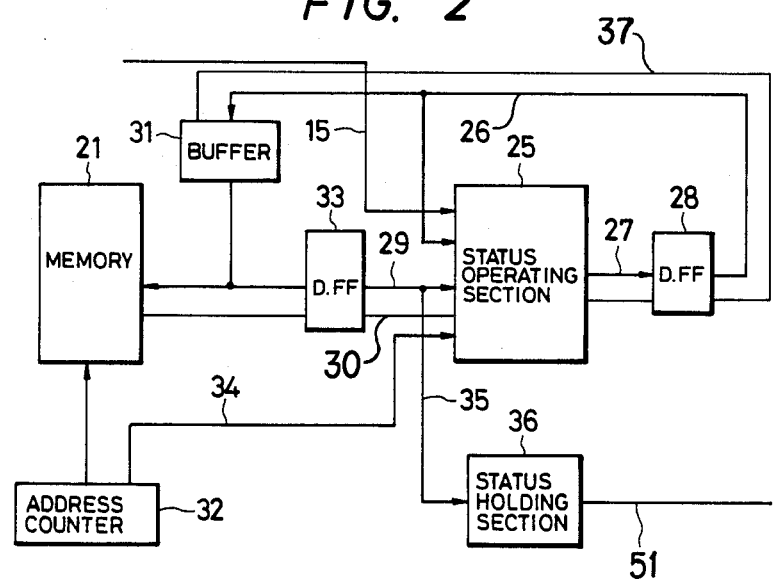
FIG. 2 is a block diagram showing a concrete example of a region determining section of the device shown in FIG. 1.

FIG. 2 shows the arrangement of the region determining section.

The region determining section 16 has a memory 21 for storing the status of a line and the status history of each block. The term "status" as used herein is defined as in the following Table 1. The term "history" as used herein is intended to mean the preceding status of the most recent corresponding block in a preceding line having a status different from the present status.

TABLE 1

|  | Status |
| --- | --- |
| Inside the region | I |
| Outside the region | O |
| On the closed loop mark | M |
| Not determined | X |

Figure 3:
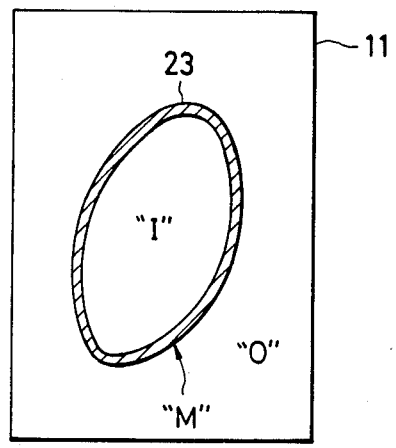
FIG. 3 is a plan view showing one example of a closed loop marked on an original.

For instance in the case where, as shown in FIG. 3, a closed loop mark 23 is drawn on an original 11, the status of the region surrounded by the mark 23 is I, the status of the region outside the mark 23 is O, the status of the mark 23 itself is M, and the status of the part which does not have any one of the above-described statuses I, O and M is X.

The status or history is determined by a status operating section 25. For this determination, the status operating section 25 receives the following signals or data:

(1) The mark data 15 outputted by the color separating section 14 in FIG. 1;

(2) Status data 26 provided by delaying a previously determined status by as much as one block. More specifically, the status data 26 is obtained by causing a first D flip-flop 28 to latch status data 27 outputted by the status operating section 25;

(3) Status data 29 and history 30 provided by delaying a previously determined status by as much as one line. More specifically, the status data 29 and history 30 are obtained as follows: the aforementioned status data 26 and history 37 updated through the status operating section 25 are outputted through a buffer 31 into a memory 21. The status data and history 30 thus inputted are read out under the control of an address counter 32 and latched by a second D flip-flop 33. Here, the content of the status data 29 in the "return" scanning operation is the result of the algorithm for the "go" scanning operation of the same line;

(4) Algorithm specifying data 34 outputted by the address counter 32. When the updating operation is achieved by scanning each line twice, i.e., "go" and "return", the address counter 32 performs an up-counting operation in a main scanning operation in one direction (hereinafter referred to as a "go" scanning operation) in the operation of reading the original 11, and a down-counting operation in a main scanning operation in the opposite direction (hereinafter referred to as a "return" scanning operation). As described later, the algorithm for operation of the status operating section 25 in the "go" scanning operation is different from that in the "return" scanning operation. Therefore, the algorithm specifying data 34 is applied to the status operating section 25 and specifies an algorithm to be employed; and When the status updating operation is achieved by scanning each line twice, i.e., "go" and "return" scanning, the status data obtained from the "go" and "return" scanning operations is temporarily held in a status holding section 36, and then supplied to the processing section 18, synchronous with the ordinary image data 17.

(5) History 30, which is the status of a block in a preceding line and in the same position as a current block with different (but not "marked") status than the current block.

FIGS. 4 and 5 show examples of a status determining algorithm in the status operating section 25. The operating section 25 preferably is made up of a ROM (read-only-memory) and receives the above-described data to perform a status determining operation. The algorithm shown in FIG. 4 is for the case where the reading section 13 performs a "go" scanning operation, and the algorithm shown in FIG. 5 is for the case where the reading section carries out a "return" scanning operation.

Figure 4A:
FIGS. 4A to 4E are explanatory diagrams for a description of an algorithm for a "go" scanning operation.
Figure 4B:
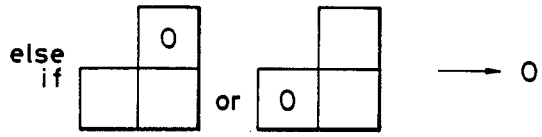
Figure 4C:
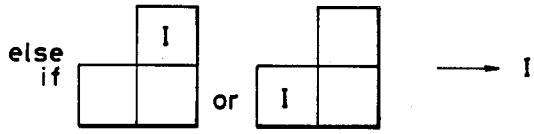

In FIGS. 4A through 4C, the block in the bottom right-hand corner of each group of three blocks will be referred to as a "concerned block." When, as shown in FIG. 4A, the mark data 15 of a concerned block indicates the mark itself (M), the status of the concerned block is "M" representing the mark. This is the case where, in FIG. 3, the mark 23 is read.

When, as shown in FIG. 4B, the block in the immediately preceding line which is located above the concerned block (hereinafter referred to as an "above block") is "O" in status, or when the block located immediately before the concerned block in the same line (hereinafter referred to as a "preceding block") is "O" in status, the status, of the concerned block is also "O". These cases in FIG. 4B occur, for example, before the reading point reaches the mark 23 after the start of the scanning operation.

Let us consider cases different from the above-described cases; that is, the cases where the concerned block is not on the mark 23 (not "M") and the proceding block and the above block are not "O" in status. When, as shown in FIG. 4C, the preceding block or the above block is inside the region (and therefore has a status of "I"), then the status of the concerned block is "I".

Figure 4D:

If, in the case which is different from the above-described cases, the above block is "X" in status, as shown in FIG. 4D, then it can be determined that the status of the concerned block is also "X".

Figure 4E:
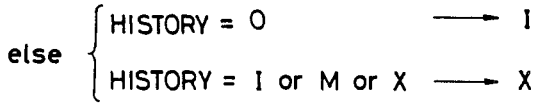
Figure 5A:
FIGS. 5A to 5E are explanatory diagrams for a description of an algorithm for a "return" scanning operation.
Figure 5B:
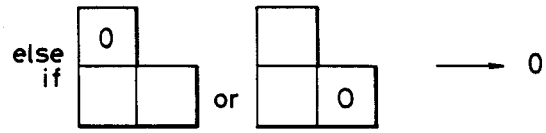
Figure 5C:
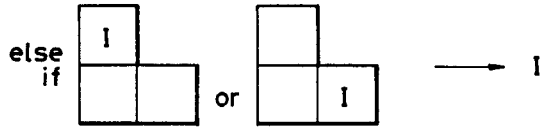
Figure 5D:
Figure 5E:
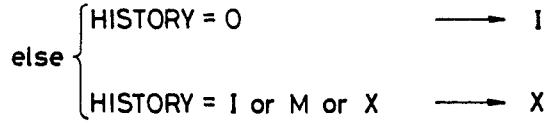

Let us consider cases which are different from all of the above-described cases, as shown in FIG. 4E. If the history before change is "O", it can be determined that the concerned block is "I" in status. If the history before change is "I", "M" or "X", then the concerned block is X in status.

Similarly, an algorithm for the "return" scanning can be determined as shown in FIG. 5. In FIGS. 5A through 5E, the "concerned block" is the block in the bottom left-hand corner of each group of three blocks. In FIGS. 5A through 5E, the topmost block in each group of three blocks represents the status assigned to the current block in an immediately previous "go" scanning operation. It does not represent a status of a block in a previous line as it did in FIG. 4.

Figure 6:
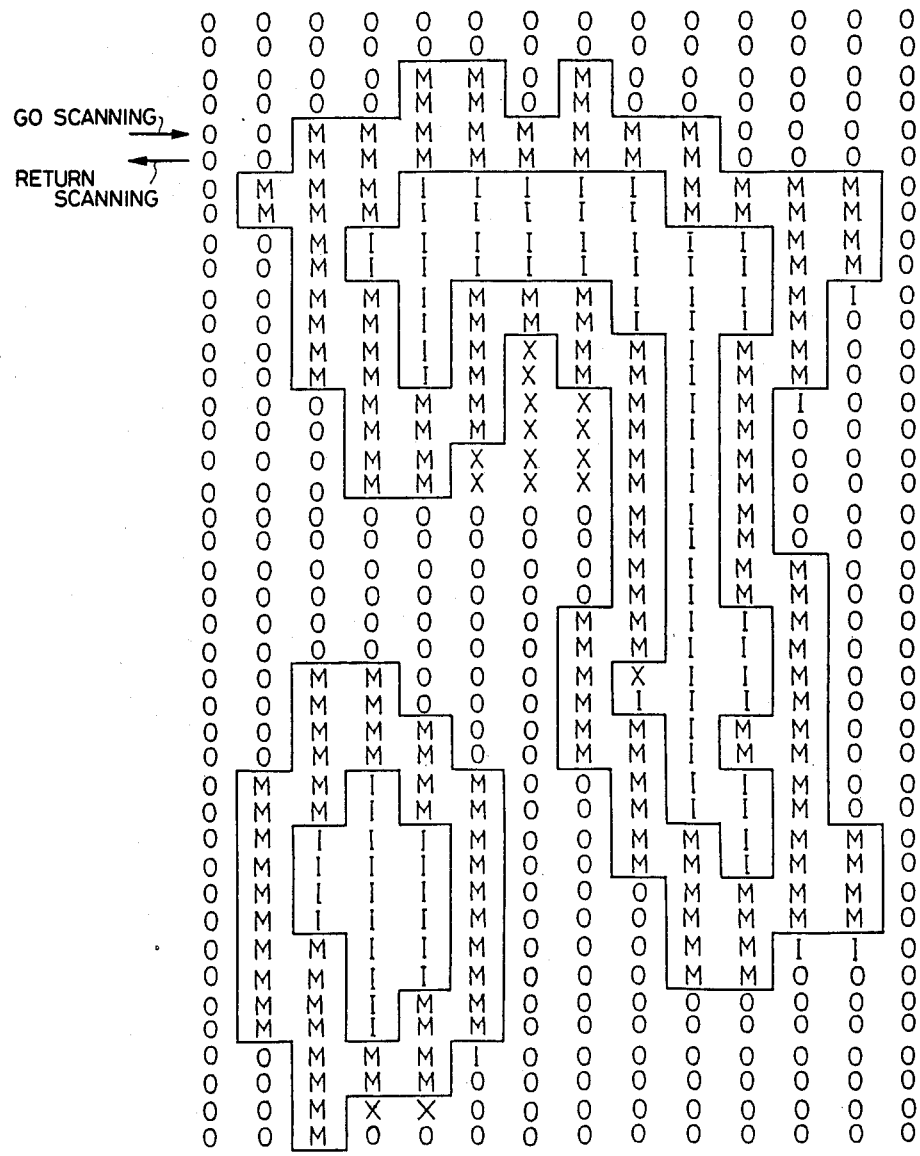
FIG. 6 is an explanatory diagram showing one example of the result of region determination.

FIG. 6 shows the transition of status in a simple region recognition carried out according to the above-described algorithms of FIGS. 4 and 5. In FIG. 6, one line on the original is represented by two lines of typed characters representing a "go" scanning operation and a "return" scanning operation, respectively. For example, the line of FIG. 6 labeled "GO SCANNING" represents the statuses of a line of blocks after a left-to-right scanning operation. The line of FIG. 6 labeled "RETURN SCANNING" represents the statuses of the same line of blocks after a right-to-left scanning operation is performed on that line. FIG. 6 is organized in this manner because each "return" scanning operation utilizes the statuses assigned during the immediately preceding "go" scan operation. The algorithm of FIGS. 4 and 5 is easier to comprehend when the intermediate statuses of a "go" scanning operation are shown. A "go" scanning operation (left-to-right) looks at the status of the preceding block on the present line, the status of a block of the preceding line, and the history of the concerned block. A "return" scanning operation, (right-to-left) looks at a status of the "go" scanning operation of the present line, the status of the preceding block, and the history of the concerned block.

The invention has been described with reference to the case where only one closed loop is drawn on the original. However, even in the case where a plurality of closed loops are drawn in different colors, the marks are separately detected by the color separating section, and therefore these marks can be individually recognized and image-processed.

In the above-described embodiment, the color separation is carried out with the closed loop marked in ordinary color such as red or blue. However, the region recognizing device alternately can be modified so that a closed loop is marked with fluorescent material and is detected by detecting means specially designed for it, or a sheet on which only a mark has been drawn is additionally prepared, and the mark on the sheet is read for recognition of the region.

As was described above, in the region recognizing device of the invention, up to one line of statuses indicating whether a block is inside or outside a closed loop drawn on the original is stored, and the statuses thus stored are revised whenever the following block is read. Therefore, even in the case where a plurality of closed loops are drawn on an original, or a part of a closed loop is curved inwardly, the region can be accurately recognized with the device of the invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A region recognizing device for detecting a closed loop line inscribed on a document, said region recognizing device comprising:

reading means operative to scan individual lines of said document for generating successive blocks of image data of said document for each scan line in succession, each block having a corresponding block in a preceding line;

line storing means for storing successive blocks of image data for at least two of said scan lines;

mark identifying means for identifying each of said successive blocks of said scan line as being on said closed loop line of said document;

single status latch means for storing a status of each of said blocks of a scanned line in succession, said status indicative of the position of said block being alternately outside, inside, or on said closed loop line of said document or having an "unknown" status;

multiple status storing means for storing said statuses of each said successive blocks of said scanned line; and status determining means responsive to said mark identifying means, to said status of a previous block stored in said single status latch means, and to said status of a corresponding block in a line where said status has been determined previously for each of said successive blocks of said line and where such status is stored in said multiple status storing means, for determining said status of each of said successive blocks of said scanned line.

2. The device of claim 1 wherein said status determining means includes go scanning means responsive to said mark identifying means, to said status of a previous block stored in said single status latch means, and to said status of a corresponding block in a preceding line stored in said multiple status storing means, for successively determining said status of each of said successive blocks, moving in a direction from a first block of said scanned line to a last block of said scanned line and storing said determined statuses in said multiple status storing means; and return scanning means responsive to said mark identifying means, to said status of a previous block stored in said single status latch means, and to said status of each of said successive blocks of said scanned line determined by said go scanning means stored in said multiple status storing means, for successively determining said status of each of said successive blocks, moving in a direction from said last block of said scanned line to said first block of said scanned line and storing said determined statuses in said multiple status storing means.

3. The device of claim 2 wherein said go scanning means comprises:

mark status means for successively determining said status of each of said successive blocks of said scanned line to be indicative of said block being on said closed loop line of said document, operative at times when said mark detecting means identifies said block as being on said closed loop line of said document;

outside status means for successively determining said status of each of said successive blocks of said scanned line to be indicative of said block being outside said closed loop line of said document, operative at times when said mark status means has not determined a status for said block and when, alternatively, either said status of said corresponding block of said previous line is indicative of said corresponding block being outside said loop line or said status of said previous block of said scanned line is indicative of said previous block being outside said closed loop line;

inside status means for successively determining said status of each of said successive blocks of said scanned line to be indicative of said block being inside said closed loop line of said document, operative at times when said mark status means and said outside status means have not determined a status for block and when, alternatively, either said status of said corresponding block of said previous line is indicative of said corresponding block being inside said closed loop line or said status of said previous block of said scanned line is indicative of said previous block being inside said closed loop line;

undecided status means for successively determining said status of each of said successive blocks of said scanned line to be indicative of the location of said block on said document being undecided, operative at times when said mark status means, said outside status means, and said inside status means have not determined a status for said block and when said status of said corresponding block of said previous line is indicative of the location of said corresponding block on said document being undecided.

4. The device of claim 2 wherein said return scanning means comprises:

mark status means for successively determining said status of each of said successive blocks of said scanned line to be indicative of said block being on said closed loop line of said document, operative at times when said go scanning means has determined the status of said block to be indicative of said block being on said closed loop line of said document;

outside status means for successively determining said status of each of said successive blocks of said scanned line to be indicative of said block being outside said closed loop line of said document, operative at times when said mark status means has not determined a status for said block and when, alternatively, either said go scanning means has determined said status of said block to be indicative of said block being outside said closed loop line or said status of said previous block of said scanned line is indicative of said previous block being outside said closed loop line;

inside status means for successively determining said status of each of said successive box of said scanned line to be indicative of said block being inside said closed loop line of said document, operative at times when said mark status means and said outside status means have not determined a status for said block and when, alternatively, either said go scanning means has determined said status of said block to be indicative of said block being inside said closed loop line or said status of said previous block of said scanned line is indicative of said previous block being inside said closed loop line;

undecided status means for successively determining said status of each of said successive blocks of said scanned line to be indicative of the location of said block on said document being undecided, operative at times when said mark status means, said outside status means, and said inside status means have not determined a status for said block and when said go scanning means has determined said status of said block to be indicative of the location of said block on said document being undecided.

5. The device of claim 1 wherein said closed loop is inscribed on said document using a predetermined color and wherein said mark identifying means comprises:

color separating means for identifying each of said successive blocks of said scanned line as being on said closed loop of a predetermined color.

6. The device of claim 1 wherein data distinct from said closed loop line is inscribed on said document and wherein said reading means further comprises:

document data means operative to scan individual lines of said document for generating blocks of document data for each scanned line in succession, each block of document data having at least one corresponding block of image data.

7. The device of claim 6 further comprising:
document separation means for classifying said blocks of document data generated by said document data means into at least one group representing the position of said document data relative to said closed loop line on said document, said classification of each block of document data responsive to said status of at least one of said successive blocks generated by said reading means and corresponding to said block of document data.

8. A method for recognizing in real-time the blocks of scan lines of an ordinal image with a closed loop inscribed thereon as having a status indicating whether each block is inside the loop, on the loop, or outside the loop, by scanning the ordinal image in the up-to-down direction, the block currently being scanned being the current block, the method comprising the steps of:
continuing to set a status of "outside" for successive current blocks having an "outside" status block in at least one of the upper, left and right directions until the current block is on the closed loop;
setting a status of the current block to "inside" when the history of the current block is "outside"; and
continuing to set a status of "inside" for successive current blocks having an "inside" status block in at least one of the upper, left and right directions until the current block is on the closed loop.

9. A method as claimed in claim 8, further comprising the steps of:
setting the status of the current block to "unknown" when the history of the current block is "inside"; and
continuing to assign the status of "unknown" to current blocks having a block in the upper direction with a status of "unknown".

10. A method as claimed in claim 9, wherein the steps of setting the status of the current block to "outside", "inside" and "unknown" is preferentially performed in the order stated in claim 9.

11. A method for recognizing blocks of scan lines of an original image with a closed loop inscribed thereon as having a status of "marked", "inside", "outside", or "unknown", where a block's status indicates whether the block is on, inside, or outside the loop or whether the block has an indeterminate status, the method comprising the steps of:
scanning the original image to produce lines of scan data; composed of blocks
for each line of scan data, saving the statuses of the blocks of an immediately previous line of scan data;
for each line of scan data, determining a status of successive current blocks of the line by performing the following sub-steps:
when a current block is on the closed loop, setting the intermediate status of the current block to "marked",
when at least one of an immediately previous block and a block immediately above the current block in the previous row has a status of "outside", setting the status of the current block to "outside",
when at least one of an immediately previous block and a block immediately above the current block in the previous row has a status of "inside", setting the status of the current block to "inside",
when a block immediately above the current block in the previous row has a status of "unknown", setting the status of the current block to "unknown",
when the current block has a history of "outside", setting the status of the current block to "inside", and
when the current block has a history of "inside", "marked", or "unknown", setting the status of the current block to "unknown".

12. A method for recognizing blocks of scan lines of an original image with a closed loop inscribed thereon as having a status of "marked," "inside," "outside," or "unknown," where a block's status indicates whether the block is on, inside, or outside the loop or whether the block has an indeterminate status, the method comprising the steps of:
scannning the original image to produce lines of scan data; composed of blocks
for each line of scan data, saving the statuses of the blocks of an immediately previous line of scan data;
for each line of scan data, determining an intermediate status of successive current blocks of the line in a first direction by performing the following sub-steps:
when a current block is on the closed loop, setting the intermediate status of the current block to "marked",
when at least one of an immediately previous block and a block immediately above the current block in the previous row has a status of "outside", setting the intermediate status of the current block to "outside",
when at least one of an immediately previous block and a block immediately above the current block in the previous row has a status of "inside", setting the intermediate status of the current block to "inside",
when a block immediately above the current block in the previous row has a status of "unknown", setting the intermediate status of the current block to "unknown",
when the current block has a history of "outside", setting the status of the current block to "inside", and
when the current block has history of "inside", "marked", or "unknown", setting the status of the current block to "unkown"; and
for each line of scan data, determining a status of successive current blocks of the line in a second direction by performing the following sub-steps:
when the current block has an intermediate status of "marked", setting the status of the current block to "marked",
when at least one of an immediately previous block and the current block has a status of "outside", setting the status of the current block to "outside",
when at least one of an immediately previous block and the current block has a status of "inside", setting the status of the current block to "inside",
when the current block has an intermediate status of "unknown", setting the status of the current block to "unknown",
when the current block has a history of "outside", setting the status of the current block to "inside", and
when the current block has a history of "inside", "marked", or "unknown", setting the status of the current block to "unknown".

* * * * *